(12) United States Patent
Tokunaga et al.

(10) Patent No.: US 11,693,204 B2
(45) Date of Patent: Jul. 4, 2023

(54) IMAGING DEVICE AND METHOD OF MANUFACTURING IMAGING DEVICE

(71) Applicant: SONY SEMICONDUCTOR SOLUTIONS CORPORATION, Kanagawa (JP)

(72) Inventors: Junichi Tokunaga, Kumamoto (JP); Yuuji Kishigami, Kumamoto (JP); Noboru Kawabata, Kumamoto (JP); Yoshihiro Nabe, Tokyo (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 254 days.

(21) Appl. No.: 16/768,198

(22) PCT Filed: Oct. 25, 2018

(86) PCT No.: PCT/JP2018/039629
§ 371 (c)(1),
(2) Date: May 29, 2020

(87) PCT Pub. No.: WO2019/111575
PCT Pub. Date: Jun. 13, 2019

(65) Prior Publication Data
US 2020/0292775 A1   Sep. 17, 2020

(30) Foreign Application Priority Data
Dec. 8, 2017   (JP) .............................. JP2017-235671

(51) Int. Cl.
*G02B 7/02*   (2021.01)
*H04N 23/51*   (2023.01)
*H04N 23/57*   (2023.01)

(52) U.S. Cl.
CPC ............... *G02B 7/02* (2013.01); *H04N 23/51* (2023.01); *H04N 23/57* (2023.01)

(58) Field of Classification Search
CPC . G02B 7/02; G02B 7/08; G03B 17/02; G03B 19/07; G03B 35/08; H04N 5/2252;
(Continued)

(56) References Cited

U.S. PATENT DOCUMENTS 8,106,970 B2 *   1/2012  Utsugi ................. H04N 17/002
                                                    358/463
9,826,132 B2 *  11/2017  Wang ..................... H04N 23/45
(Continued)

FOREIGN PATENT DOCUMENTS

CN    204548106 U    8/2015
CN    105556946 A    5/2016
(Continued)

OTHER PUBLICATIONS

Office Action for CN Patent Application No. 201880077446.0, dated May 24, 2021, 03 pages of Office Action and 05 pages of English Translation.
(Continued)

*Primary Examiner* — Amy R Hsu
(74) *Attorney, Agent, or Firm* — Chip Law Group

(57) ABSTRACT

To improve strength of an imaging module with an adjusted optical axis. An imaging device includes an imaging module and a holding unit. The imaging module provided in the imaging device includes an imaging element that images incident light introduced from an upper surface of a housing. The holding unit provided in the imaging device surrounds and holds a side surface of the imaging module, the side surface being adjacent to the upper surface of the housing. The holding unit surrounds and holds the side surface of the imaging module, thereby protecting the imaging module.

7 Claims, 9 Drawing Sheets

(58) Field of Classification Search
CPC ... H04N 5/2253; H04N 5/2254; H04N 5/2257
See application file for complete search history.

(56) References Cited

U.S. PATENT DOCUMENTS

| | | | | |
|---|---|---|---|---|
| 2007/0183063 A1* | 8/2007 | Zengerling | ......... | G03F 7/70825 |
| | | | | 359/819 |
| 2008/0151079 A1* | 6/2008 | Iijima | .................... | H04N 23/15 |
| | | | | 348/241 |
| 2016/0349528 A1* | 12/2016 | Kishine | .............. | G02B 13/0045 |

FOREIGN PATENT DOCUMENTS

| | | | |
|---|---|---|---|
| CN | 107395932 | A | 11/2017 |
| CN | 206629149 | U | 11/2017 |
| CN | 206629164 | U | 11/2017 |
| JP | 2012-173737 | A | 9/2012 |
| JP | 2014174551 | A | 9/2014 |
| JP | 2016-174218 | A | 9/2016 |
| KR | 1132209 | B | 3/2012 |
| KR | 1132209 | B1 | 3/2012 |
| KR | 101132209 | B1 | 3/2012 |
| KR | 10-2013-0061322 | A | 6/2013 |
| TW | 201736934 | A | 10/2017 |
| TW | 201741752 | A | 12/2017 |
| WO | 2017/179445 | A1 | 10/2017 |

OTHER PUBLICATIONS

International Search Report and Written Opinion of PCT Application No. PCT/JP2018/039629, dated Dec. 11, 2018, 04 pages of ISRWO.

\* cited by examiner

IMAGING DEVICE AND METHOD OF MANUFACTURING IMAGING DEVICE

CROSS REFERENCE TO RELATED APPLICATIONS

This application is a U.S. National Phase of International Patent Application No. PCT/JP2018/039629 filed on Oct. 25, 2018, which claims priority benefit of Japanese Patent Application No. JP 2017-235671 filed in the Japan Patent Office on Dec. 8, 2017. Each of the above-referenced applications is hereby incorporated herein by reference in its entirety.

TECHNICAL FIELD

The present technology relates to an imaging device and a method of manufacturing an imaging device. Specifically, the present technology relates to an imaging device used by being incorporated in a device or the like and a method of manufacturing the imaging device.

BACKGROUND ART

Conventionally, cameras in which a plurality of imaging elements is arranged have been used. For example, in cameras that generate a three-dimensional (3D) image, a camera that generates two image signals using two imaging elements arranged with a predetermined distance from each another is used. In this case, since an optical system member such as a lens is arranged for each imaging element, optical axes of the plurality of imaging elements need to be adjusted. Therefore, a camera is used, in which one module is configured by combining an imaging element and an optical system member, and the optical axis is adjusted for each module before mounting. For example, a camera is used, in which first and second camera modules each including a lens barrel and an image sensor are mounted on one mechanical member (for example, see Patent Document 1).

In the above-described camera, after the first camera module is fixedly coupled to the mechanism member, the first camera module performs imaging and obtains a data value. Next, the second camera module similarly performs imaging and obtains a data value. Optical axis adjustment is performed by comparing these two data values and adjusting the position of the second camera module with reference to the first camera module. Thereafter, the second camera module is fixedly coupled to the mechanism member. Here, coupling members are arranged on a pair of opposed side surfaces of the camera modules. Furthermore, the mechanism member includes a mounting portion extending from a bottom surface to an upper side so as to support the pair of opposed side surfaces of the camera modules. The camera modules are arranged on the bottom surface of the mechanism member, and the coupling members of the camera modules and the mounting portion of the mechanism member are coupled by soldering or the like, so that the first and second camera modules with adjusted optical axes and the mechanism member are coupled. Thereafter, the mechanism member to which the first and second camera modules are fixedly coupled is attached to the camera.

CITATION LIST

Patent Document

Patent Document 1: Japanese Patent Application Laid-Open No. 2012-173737

SUMMARY OF THE INVENTION

Problems to be Solved by the Invention

In the above-described related art, the camera modules and the mechanical member are coupled to each other on the pair of opposed side surfaces, and there is a problem that strength is insufficient.

The present technology has been made in view of the above-described problem, and an object of the present technology is to improve strength of an imaging module with an adjusted optical axis.

Solutions to Problems

The present technology has been made to solve the above-described problem, and the first aspect of the present technology is an imaging device including an imaging module provided with an imaging element configured to image incident light introduced from an upper surface of a housing, and a holding unit configured to surround and hold a side surface of the imaging module, the side surface being adjacent to the upper surface. This brings about an effect that the side surface of the imaging module is surrounded by the holding unit.

Furthermore, in the first aspect, a plurality of the connected imaging modules may be further provided, and the holding unit may surround and hold the side surfaces of the plurality of connected imaging modules. This brings about an effect that the side surfaces of the plurality of connected imaging modules are surrounded by the holding unit.

Furthermore, in the first aspect, the plurality of imaging modules may be connected after adjustment of optical axes. This brings about an effect that the optical axes are adjusted before the plurality of imaging modules is connected.

Furthermore, the second aspect of the present technology is a method of manufacturing an imaging device, the method including an attaching step of attaching an imaging module provided with an imaging element configured to image incident light introduced from an upper surface of a housing to a holding unit configured to surround and hold a side surface of the imaging module, the side surface being adjacent to the upper surface. This brings about an effect that the side surface of the imaging module is surrounded by the holding unit.

Furthermore, in the second aspect, a connecting step of connecting a plurality of the imaging modules may be further included, and the attaching step may include attaching the plurality of connected imaging modules to the holding unit configured to surround and hold the side surfaces of the plurality of connected imaging modules. This brings about an effect that the side surfaces of the plurality of connected imaging modules are surrounded by the holding unit.

Furthermore, in the second aspect, an optical axis adjusting step of adjusting optical axes of the plurality of imaging modules may be further included, and the connecting step may include connecting the plurality of imaging modules with the adjusted optical axes. This brings about an effect that the optical axes are adjusted before the plurality of imaging modules is connected.

Effects of the Invention

According to the present technology, an excellent effect of improving strength of an imaging module with an adjusted optical axis is exerted.

MODE FOR CARRYING OUT THE INVENTION

Figure 1:
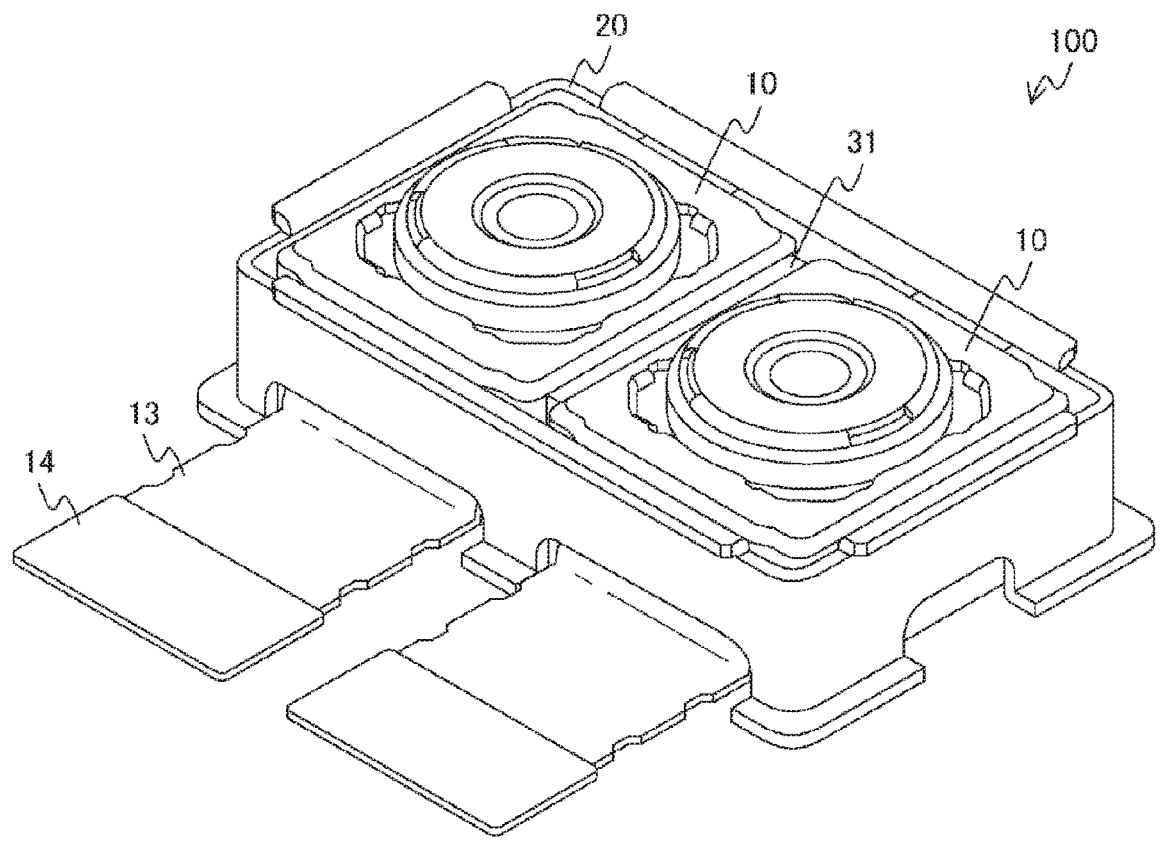
FIG. 1 is a view illustrating a configuration example of an imaging device according to a first embodiment of the present technology.

Next, embodiments for implementing the present technology (hereinafter, referred to as embodiments) will be described with reference to the drawings. In the drawings below, the same or similar parts are denoted by the same or similar reference numerals. Note that the drawings are schematic, and the dimensional ratios and the like of the respective parts do not always correspond to actual ones. Furthermore, it is needless to say that dimensional relationships and ratios are different among the drawings. Furthermore, the embodiments will be described in the following order.
1. First Embodiment
2. Second Embodiment
3. Application to Camera

1. First Embodiment

[Configuration of Imaging Device]

FIG. 1 is a view illustrating a configuration example of an imaging device according to a first embodiment of the present technology. An imaging device 100 in FIG. 1 includes an imaging module 10 and a holding unit 20. Note that the imaging device 100 in FIG. 1 represents an example including two imaging modules 10.

The imaging module 10 generates an image signal of an object. The imaging module 10 is configured such that an imaging element (an imaging element 17 to be described below) that images an object and an optical member that forms an image of light from the object on the imaging element are arranged in one module. In FIG. 1, the two imaging modules 10 are connected and held by the holding unit 20 to be described below. These two imaging modules 10 are bonded and connected to each other with an adhesive 31. Furthermore, a signal cable 13 is connected to each of the imaging modules 10, and an image signal from the imaging element and a control signal of the imaging element are transmitted. A connector 14 is arranged at an end of the signal cable 13. Details of the configuration of the imaging module 10 will be described below.

The holding unit 20 holds the imaging module 10. The holding unit surrounds and holds a side surface of the imaging module 10. Here, the side surface of the imaging module 10 is a surface adjacent to an upper surface that is a surface to which light from an object is introduced in the imaging module 10. Furthermore, the holding unit 20 in FIG. 1 surrounds and holds side surfaces of the two connected imaging modules 10.

As described above, in the imaging device 100 in FIG. 1, the two imaging modules 10 are held by the holding unit 20, so that the two imaging modules 10 and the holding unit 20 can be handled as one component. The imaging device 100 provided with such two imaging modules 10 can be used for, for example, a camera that acquires a 3D image. Furthermore, for example, the imaging device 100 can be used for a camera that acquires images of the same object with visible light and infrared light.

[Configuration of Imaging Module]

Figure 2:
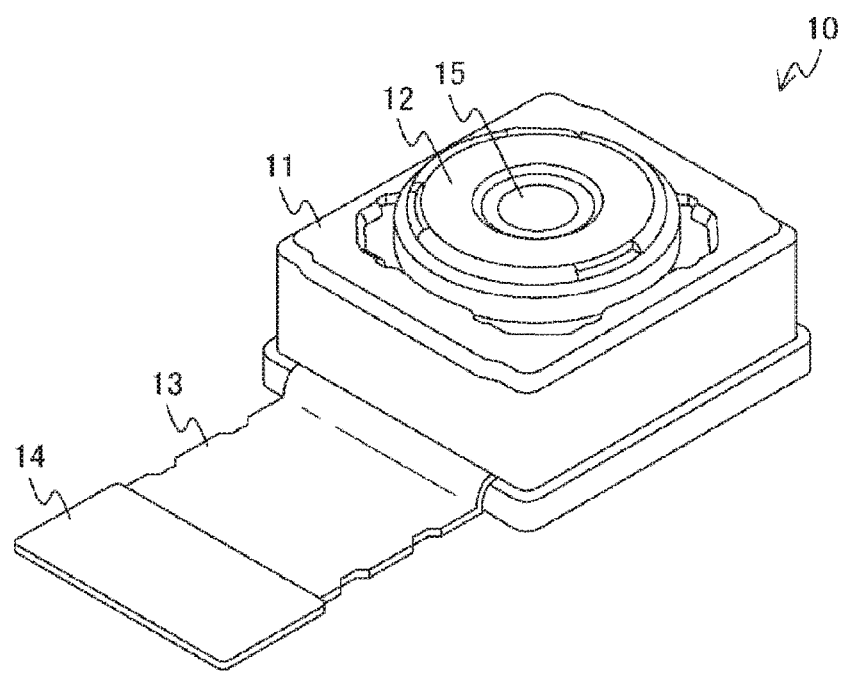
FIG. 2 is a view illustrating a configuration example of an imaging module according to the embodiment of the present technology.

FIG. 2 is a view illustrating a configuration example of the imaging module according to the embodiment of the present technology. FIG. 2 is a view illustrating an appearance of the imaging module 10. The imaging module 10 in FIG. 2 includes a housing 11 and a lens barrel 12.

The housing 11 is a housing that holds the lens barrel 12 and the imaging element. An opening is formed in an upper surface of the housing 11, and the lens barrel 12 is arranged in the opening.

The lens barrel 12 supports a lens 15 and changes the position of the lens 15 to adjust a focal position. The lens barrel 12 is configured in a cylindrical shape, and the lens 15 is housed in a central portion. An actuator that changes the position of the lens 15 in an up-down direction is arranged around the lens 15, and can focus on a surface of the imaging element. The lens barrel 12 corresponds to the above-described optical member.

Figure 3:
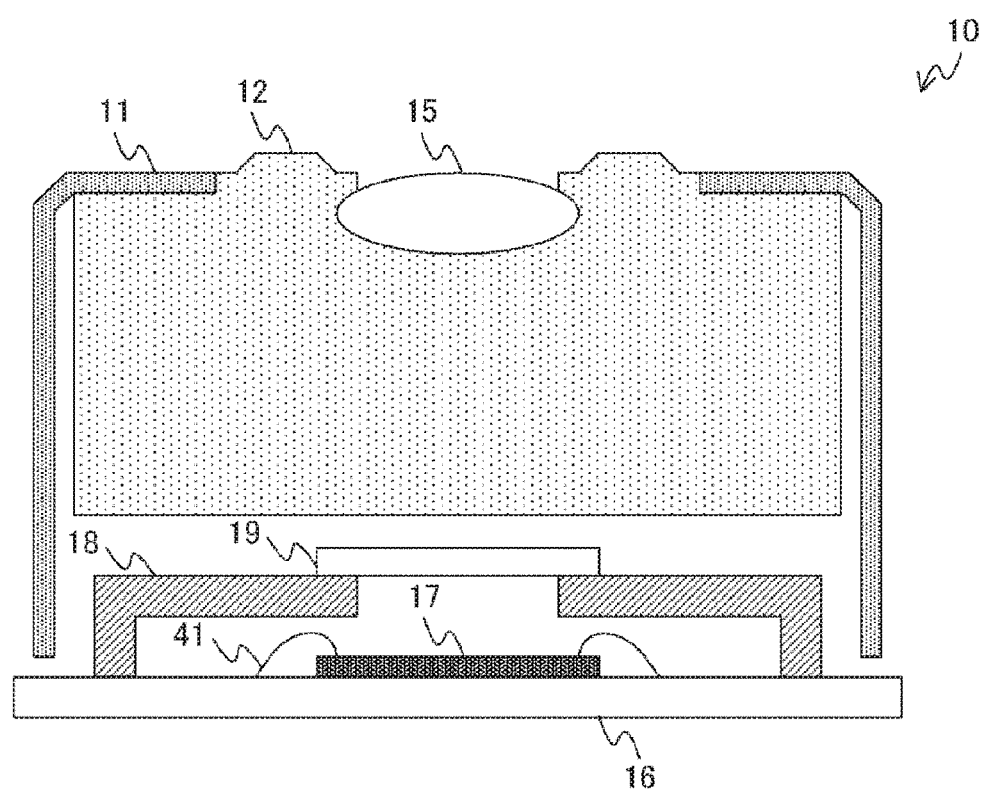
FIG. 3 is a cross-sectional view illustrating a configuration example of the imaging module according to the embodiment of the present technology.

FIG. 3 is a cross-sectional view illustrating a configuration example of the imaging module according to the embodiment of the present technology. A substrate 16 is arranged in a lower portion of the housing 11, and an imaging element 17 sealed with a frame 18 and a cover glass 19 is mounted on a surface of the substrate 16. At this time, the imaging element 17 is mounted on the substrate 16 by die bonding and connected to the substrate 16 by a bonding wire 41. Note that a glass that blocks infrared light can be used for the cover glass 19. The lens barrel 12 is arranged above the imaging element 17, and the light from the object collected by the lens 15 is imaged on the surface of the imaging element 17. Note that the lens 15 in FIG. 3 schematically represents an arrangement of the lens in the lens barrel 12. The lens barrel 12 can be configured to collect incident light by a plurality of lenses, for example. Furthermore, an optical axis of the imaging element 17 can be adjusted with the lens 15. This can be performed by, for example, adjusting a mounting position and an angle of the imaging element 17 with respect to the substrate 16.

[Configuration of Holding Unit]

Figure 4:
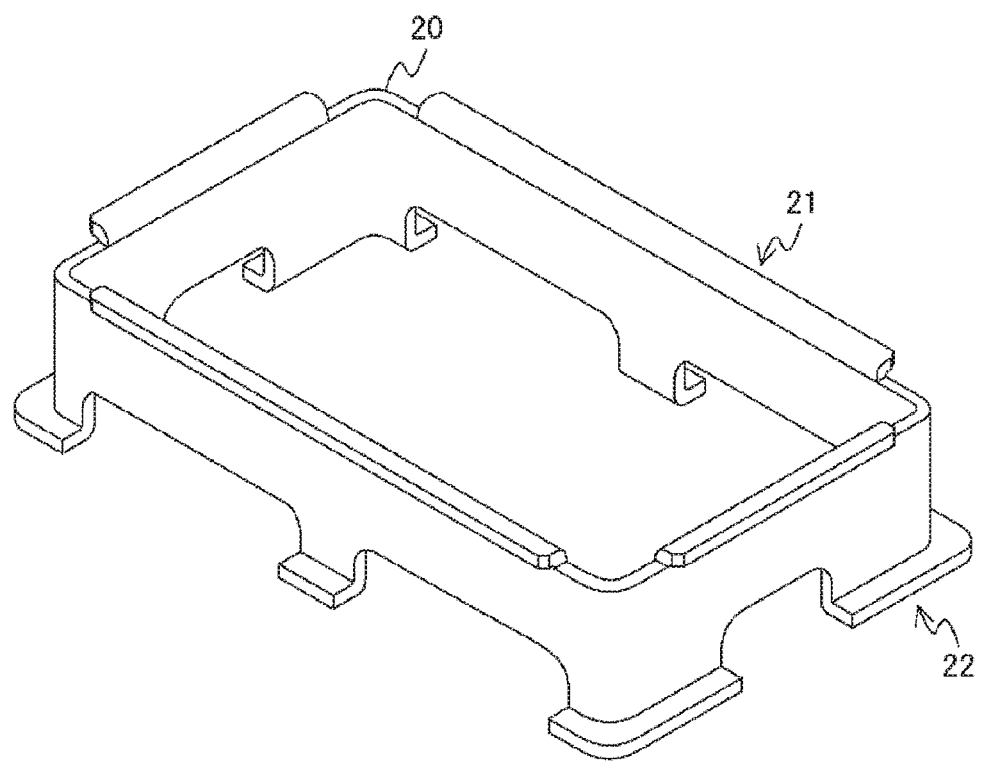
FIG. 4 is a view illustrating a configuration example of a holding unit according to the first embodiment of the present technology.

FIG. 4 is a view illustrating a configuration example of the holding unit according to the first embodiment of the present technology. As illustrated in FIG. 4, the holding unit 20 configures a wall-shaped housing that surrounds the two connected imaging modules 10. Furthermore, leg pieces 21 and 22 are arranged at an upper end and a lower end of the holding unit 20, respectively. These leg pieces 21 and 22 configure horizontal surfaces with respect to the above-described wall-shaped housing. When the imaging device 100 is incorporated in a camera or the like, these leg pieces 21 and 22 are brought into contact with the housing of the camera or the like, so that the holding unit 20 is fixed. Further, by setting the holding unit 20 including the leg pieces 21 and 22 to be higher than the imaging module 10, the strength in a state where an imaging device is incorporated in a camera 200 to be described below can be improved.

In a case where the two imaging modules 10 are connected and arranged on the holding unit 20, the holding unit 20 has a rectangular shape. At this time, as illustrated in FIG. 4, the leg pieces 21 and 22 are arranged at a central portion of a long side of the rectangular shape and brought into contact with the housing of the camera or the like, so that the strength of a central portion of the imaging device 100 can be improved. Furthermore, as described in FIG. 1, the two imaging modules 10 are bonded to each other with the adhesive 31 arranged in the central portion, so that the strength in the central portion of the imaging device 100 can be further improved. Note that the shape of the holding unit 20 is not limited to this example. For example, a square or circular holding unit 20 can be used. Furthermore, a holding unit 20 having a projection used for positioning or the like when the imaging device 100 is attached to a device or the like can also be used.

The holding unit 20 can bond and hold the two imaging modules 10 with an adhesive, for example. Furthermore, the holding unit 20 can be configured using a metal. Note that the configuration of the holding unit 20 is not limited to this example. For example, the leg pieces 21 and 22 can be omitted to provide a simplified configuration. Furthermore, for example, a holding unit 20 configured using a resin can also be used.

[Configuration of Camera]

Figure 5:
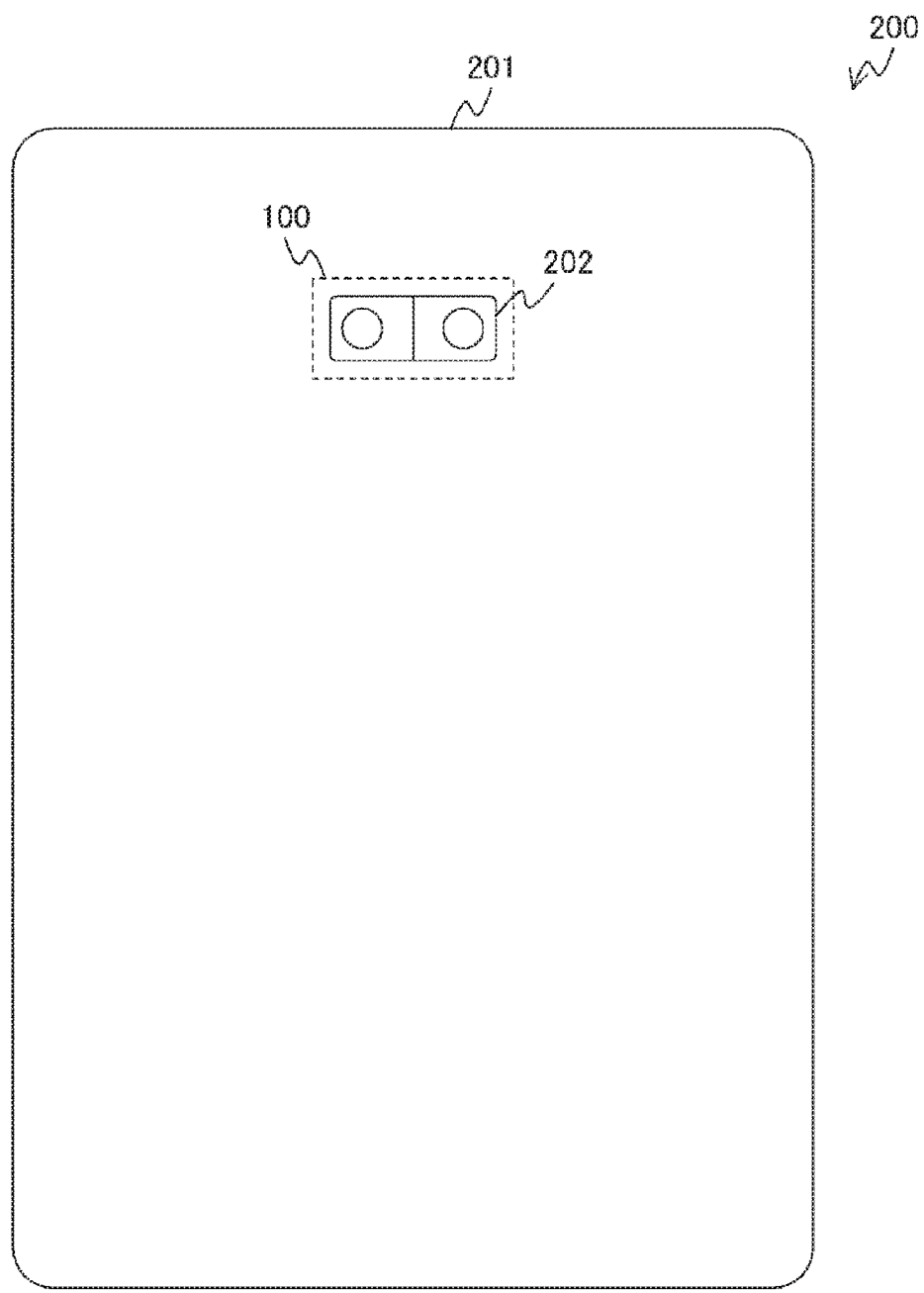
FIG. 5 is a view illustrating a configuration example of a camera according to the first embodiment of the present technology.

FIG. 5 is a view illustrating a configuration example of a camera according to the first embodiment of the present technology. A configuration of a device in which the imaging device 100 is arranged will be described using a camera 200 in FIG. 5 as an example. For example, a mobile phone or a smartphone having a camera function corresponds to the camera 200. The camera 200 includes a housing 201 having an opening 202. The imaging device 100 is arranged inside the housing 201, and images light from an object irradiated through the opening 202. In FIG. 5, the dotted rectangle represents an outer shape of the imaging device 100, and the solid circle represents the lens barrel 12.

Figure 6:
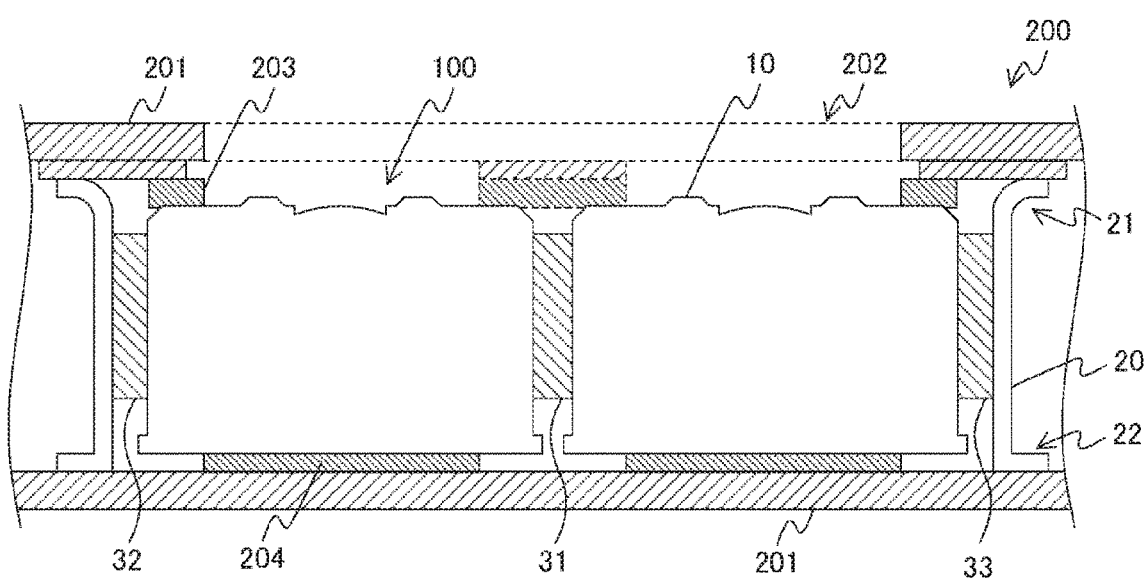
FIG. 6 is a cross-sectional view illustrating a configuration example of the camera according to the first embodiment of the present technology.

FIG. 6 is a cross-sectional view illustrating a configuration example of the camera according to the first embodiment of the present technology. FIG. 6 is a view illustrating a cross section of a region of the camera 200 where the imaging device 100 is arranged. As illustrated in FIG. 6, the imaging device 100 is arranged in the housing 201. The holding unit 20 is arranged in contact with upper and lower inner surfaces of the housing 201. At this time, the leg pieces 21 and 22 are in contact with the housing 201. Furthermore, the imaging module 10 is sandwiched between cushions 203 and 204. The cushions 203 and 204 fix the position of the imaging module 10 and dissipate heat of the imaging module 10. Note that the imaging modules 10 are bonded to each other with the above-described adhesive 31, and is bonded to the holding unit 20 with adhesives 32 and 33. As the adhesives 31 to 33, for example, a photocurable resin, a thermosetting resin, a thermoplastic resin, a solder, or the like can be used. Hereinafter, a resin having both photocurable and thermosetting properties is assumed as the adhesives 31 to 33.

By arranging the holding unit 20 in contact with the housing 201 as described above, arrangement of braces and the like for holding the upper and lower gaps of the housing 201 near the imaging device 100 can be omitted. Furthermore, gaps can be provided between upper and lower parts of the imaging module 10 and the housing 201. With the configuration, the imaging module 10 can be protected from impact or the like applied to the camera 200, and the strength of the imaging device 100 can be improved. Furthermore, since the imaging device 100 includes the holding unit 20, a top plate, a bottom plate, and an adhesive for bonding the top plate and the bottom plate can be omitted, and a low-profile configuration can be achieved.

[Method of Manufacturing Imaging Device]

Figure 7:
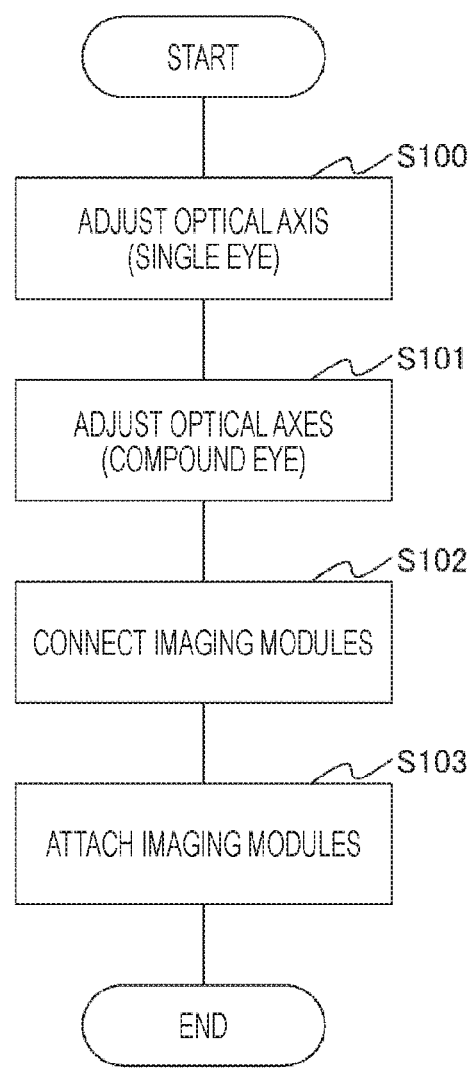
FIG. 7 is a flowchart illustrating an example of a method of manufacturing the imaging device according to the first embodiment of the present technology.

FIG. 7 is a flowchart illustrating an example of a method of manufacturing the imaging device according to the first embodiment of the present technology. First, an optical axis in a single eye is adjusted. That is, the optical axis of the imaging module 10 alone is adjusted (step S100). The optical axis adjustment can be performed by six-axis adjustment of the imaging element 17 with respect to the lens 15. Here, the six-axis adjustment is adjustment in which adjustment in three axes including axes (x, y) perpendicular to the optical axis and an axis (z) parallel to the optical axis is performed, and rotation angles around these three axes are adjusted. Furthermore, the adjustment can be performed by, for example, active alignment. This is a method of capturing an image for adjustment while changing the position of the imaging element 17 and confirming the image, and performing adjustment.

Next, optical axes in a compound eye are adjusted. That is, adjustment to align the optical axes of the two imaging modules 10 is performed (step S101). This adjustment can be performed by adjusting the optical axis of one imaging module 10 of the two imaging modules 10 with reference to the optical axis of the other imaging module 10. For example, the adjustment can be performed by adjusting the optical axis of the one imaging module 10 to become parallel to the optical axis of the reference imaging module 10.

Next, the two imaging modules 10 with the adjusted optical axes are connected (step S102). The connection can be performed by bonding the two imaging modules 10 with the adhesive 31 described with reference to FIG. 6. In a case of using the above-described resin having both the photocurable and thermosetting properties as the adhesive 31, the above-described adjustment of optical axes in a compound eye is performed after the adhesive 31 is applied between the two imaging modules 10 for which the adjustment of the optical axis in a single eye has been performed. Thereafter, the connection can be performed by radiating ultraviolet rays to cure (temporarily cure) the adhesive 31.

Next, the two connected imaging modules 10 are attached to the holding unit 20 (step S103). The attachment can be performed by arranging the holding unit 20 at a position surrounding the side surfaces of the two connected imaging modules 10 and applying and curing the adhesives 32 and 33 described with reference to FIG. 6. Specifically, the attachment can be performed according to the following procedure. First, the holding unit 20 is arranged around the two connected imaging modules 10, and the adhesives 32 and 33 are applied. The application can be performed by filling the gap between the two connected imaging modules 10 and the holding unit 20 with the above-described resin having both the photocurable and thermosetting properties, for example.

Next, the optical axis adjustment between the two connected imaging modules 10 and the holding unit 20 is performed. The optical axis adjustment can be performed by adjusting four axes including the x, y, and z axes and the rotation angle (θ) around the z axis such that the position of a midpoint of the two lenses 15 of the two connected imaging modules 10 coincides with the center of the holding unit 20. Next, the adhesives 32 and 33 are temporarily cured by radiating ultraviolet rays. Finally, the imaging device 100 is heated by a reflow furnace or the like, and the adhesives 31 to 33 are completely cured (main curing). Thereby, the two connected imaging modules 10 can be attached to the holding unit 20.

The imaging device 100 can be manufactured by the above processes. As described above, the resin having both the photocurable and thermosetting properties is used for the adhesives 31 to 33, and the adhesives 31 to 33 are temporarily cured by photocuring in the bonding of the side surfaces of the two connected imaging modules 10 and the bonding of the two connected imaging modules 10 and the holding unit 20. The imaging modules 10 and the holding unit 20 after the temporary curing are heated, and the main curing by thermosetting of the adhesives 31 to 33 is collectively performed, so that the manufacturing process can be simplified. Furthermore, since the heating process can be reduced, occurrence of displacement of the optical axis due to heating can be reduced.

Note that the configuration of the imaging device 100 is not limited to this example. For example, a configuration including three or more imaging modules 10 can be adopted.

As described above, the imaging device 100 according to the embodiment of the present technology has the holding unit 20 that surrounds and holds the side surfaces of the plurality of connected imaging modules 10, whereby protecting the imaging modules 10, and improving the strength of the imaging device 100.

2. Second Embodiment

The above-described imaging device 100 according to the first embodiment has included the two imaging modules 10. In contrast, an imaging device 100 according to a second embodiment of the present technology is different from that of the first embodiment in including one imaging module 10.

[Configuration of Imaging Device]

Figure 8:
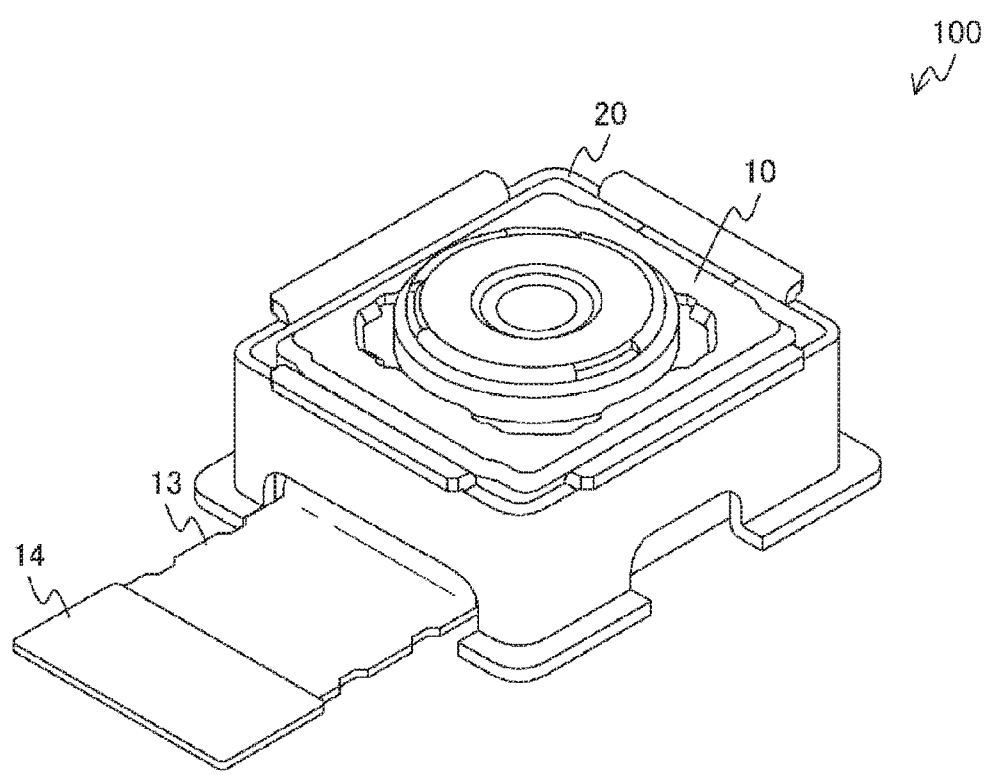
FIG. 8 is a view illustrating a configuration example of an imaging device according to a second embodiment of the present technology.

FIG. 8 is a view illustrating a configuration example of the imaging device according to the second embodiment of the present technology. The imaging device 100 in FIG. 8 is different from the imaging device 100 described in FIG. 1 in including one imaging module 10. In the imaging device 100 in FIG. 8, a holding unit 20 surrounds and holds a side surface of the imaging module 10.

The imaging device 100 in FIG. 8 can be manufactured by a process in which steps S101 and S102 are omitted from the manufacturing process described in FIG. 7.

Since configurations of the imaging device 100 other than the above configuration are similar to those of the imaging device 100 described in the first embodiment of the present technology, description is omitted.

As described above, the imaging device 100 according to the second embodiment of the present technology has the holding unit 20 that surrounds and holds the side surface of the one imaging module 10, whereby protecting the imaging module 10, and improving the strength of the imaging device 100.

3. Application to Camera

The present technology can be applied to various products. For example, the present technology may be implemented as an imaging device mounted on the camera described in the above embodiment.

Figure 9:
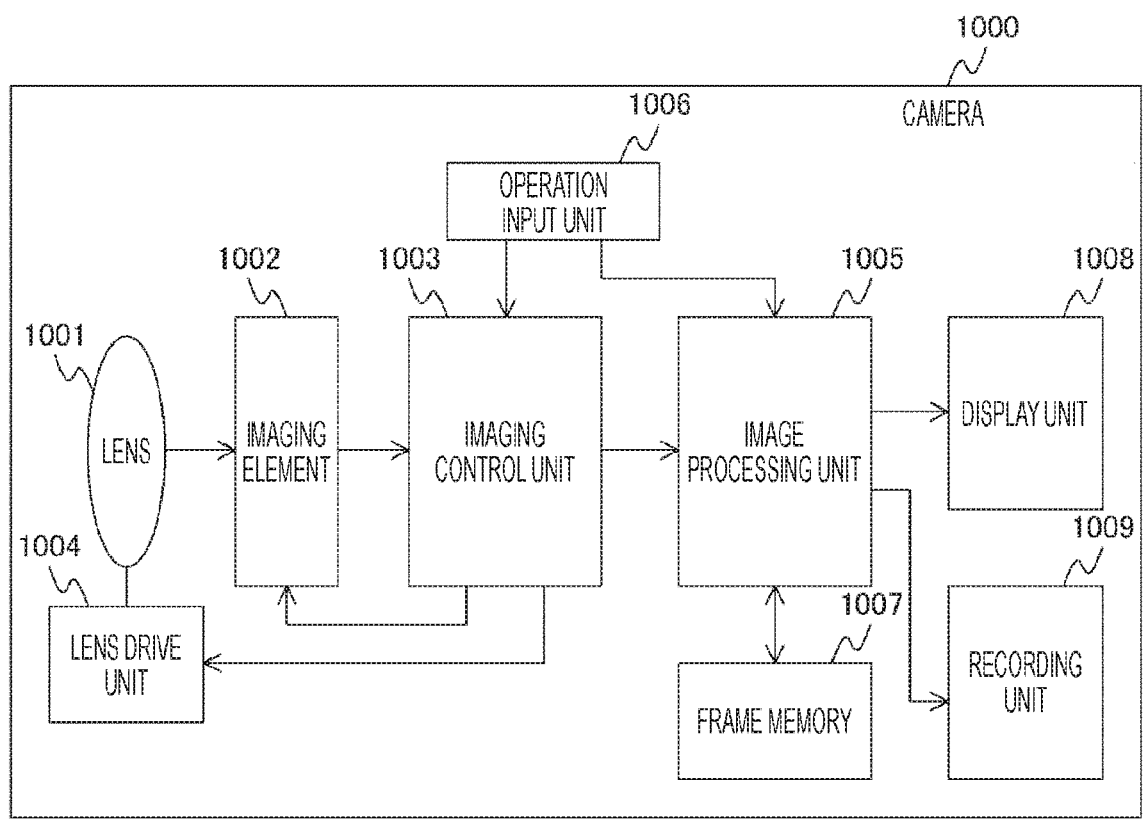
FIG. 9 is a block diagram illustrating a schematic configuration example of a camera as an example of a device to which the present technology is applicable.

FIG. 9 is a block diagram illustrating a schematic configuration example of a camera as an example of a device to which the present technology is applicable. A camera 1000 in FIG. 9 includes a lens 1001, an imaging element 1002, an imaging control unit 1003, a lens drive unit 1004, an image processing unit 1005, an operation input unit 1006, a frame memory 1007, a display unit 1008, and a recording unit 1009.

The lens 1001 is an imaging lens of the camera 1000. The lens 1001 collects light from an object and causes the collected light to enter the imaging element 1002 to be described below to form an image of the object.

The imaging element 1002 is a semiconductor element that images the light from the object collected by the lens 1001. The imaging element 1002 generates an analog image signal according to the radiated light, and converts the analog image signal into a digital image signal and outputs the digital image signal.

The imaging control unit 1003 controls imaging by the imaging element 1002. The imaging control unit 1003 controls the imaging element 1002 by generating a control signal and outputting the control signal to the imaging element 1002. Furthermore, the imaging control unit 1003 can perform autofocus in the camera 1000 on the basis of the image signal output from the imaging element 1002. Here, the autofocus is a system that detects a focal position of the lens 1001 and automatically adjusts the focal position. As the autofocus, a method of detecting an image plane phase difference using a phase difference pixel arranged in the imaging element 1002 and detecting the focal position (image plane phase difference autofocus) can be used. Furthermore, a method of detecting a position where the contrast of an image becomes the highest as the focal position (contrast autofocus) can be applied. The imaging control unit 1003 adjusts the position of the lens 1001 via the lens drive unit 1004 on the basis of the detected focal position, and performs autofocus. Note that the imaging control unit 1003 can be configured by, for example, a digital signal processor (DSP) equipped with firmware.

The lens drive unit 1004 drives the lens 1001 on the basis of the control of the imaging control unit 1003. The lens drive unit 1004 can drive the lens 1001 by changing the position of the lens 1001 using a built-in motor.

The image processing unit 1005 processes an image signal generated by the imaging element 1002. This processing corresponds to, for example, demosaicing for generating an image signal of a missing color among image signals corresponding to red, green, and blue for each pixel, noise reduction for removing noise of the image signal, encoding of the image signal, and the like. The image processing unit 1005 can be configured by, for example, a microcomputer equipped with firmware.

The operation input unit 1006 receives an operation input from a user of the camera 1000. As the operation input unit 1006, for example, a push button or a touch panel can be used. The operation input received by the operation input unit 1006 is transmitted to the imaging control unit 1003 and the image processing unit 1005. Thereafter, processing corresponding to the operation input, for example, processing such as imaging of the object is started.

The frame memory 1007 is a memory that stores a frame that is an image signal for one screen. The frame memory 1007 is controlled by the image processing unit 1005, and holds frames in the course of image processing.

The display unit 1008 displays an image processed by the image processing unit 1005. For the display unit 1008, for example, a liquid crystal panel can be used.

The recording unit 1009 records an image processed by the image processing unit 1005. For the recording unit 1009, for example, a memory card or a hard disk can be used.

The camera to which the present invention is applicable has been described. The present technology can be applied to the lens 1001, the imaging element 1002, and the lens drive unit 1004 among the above-described configurations. Specifically, the imaging device 100 illustrated in FIG. 1 can be applied to the lens 1001, the imaging element 1002, and the lens drive unit 1004. By applying the imaging device 100, the imaging element 1002 can be protected from impact or the like.

Note that, although the camera has been described as an example here, the technology according to the present invention may be applied to, for example, a monitoring device or the like.

Lastly, the description of each of the above embodiments is an example of the present technology, and the present technology is not limited to the above-described embodiments. Therefore, it goes without saying that various changes can be made according to design and the like even if the changes are other than the above-described embodiments as long as the changes do not depart from the technical idea of the present technology.

Furthermore, the processing procedures described in the above embodiments may be regarded as a method having these series of procedures, and also regarded as a program for causing a computer to execute these series of procedures and as a recording medium for storing the program. As the recording medium, for example, a compact disc (CD), a digital versatile disc (DVD), a memory card, or the like can be used.

Note that the present technology can also have the following configurations.

(1) An imaging device including:
an imaging module provided with an imaging element configured to image incident light introduced from an upper surface of a housing; and
a holding unit configured to surround and hold a side surface of the imaging module, the side surface being adjacent to the upper surface.

(2) The imaging device according to (1), further including:
a plurality of the imaging modules connected, in which
the holding unit surrounds and holds the side surfaces of the plurality of connected imaging modules.

(3) The imaging device according to (2), in which the plurality of imaging modules is connected after adjustment of optical axes.

(4) A method of manufacturing an imaging device, the method including:
an attaching step of attaching an imaging module provided with an imaging element configured to image incident light introduced from an upper surface of a housing to a holding unit configured to surround and hold a side surface of the imaging module, the side surface being adjacent to the upper surface.

(5) The method of manufacturing an imaging device according to (4), the method further including:
a connecting step of connecting a plurality of the imaging modules, in which
the attaching step includes attaching the plurality of connected imaging modules to the holding unit configured to surround and hold the side surfaces of the plurality of connected imaging modules.

(6) The method of manufacturing an imaging device according to (5), the method further including:
an optical axis adjusting step of adjusting optical axes of the plurality of imaging modules, in which
the connecting step includes connecting the plurality of imaging modules with the adjusted optical axes.

REFERENCE SIGNS LIST

10 Imaging module
11 Housing
12 Lens barrel
15, 1001 Lens
17, 1002 Imaging element
20 Holding unit
21, 22 Leg piece
31 to 33 Adhesive
100 Imaging device
200, 1000 Camera
201 Housing
1004 Lens drive unit

The invention claimed is:

1. An imaging device, comprising:
a lens barrel;
a housing;
an imaging module with an imaging element configured to image incident light introduced from an upper surface of the housing, wherein the housing holds the lens barrel and the imaging element; and
a holding unit configured to surround and hold a side surface of the imaging module, wherein
the side surface is adjacent to the upper surface of the housing,
the holding unit includes a first leg piece at an upper end of the holding unit and a second leg piece at a lower end of the holding unit, and
the first leg piece and the second leg piece are in contact with the housing to fix the holding unit in the housing.

2. The imaging device according to claim 1, further comprising
a plurality of imaging modules, wherein
the plurality of imaging modules includes the imaging module, and
the holding unit is further configured to surround and hold side surfaces of the plurality of imaging modules.

3. The imaging device according to claim 2, wherein the plurality of imaging modules is connected after adjustment of optical axes.

4. A method of manufacturing an imaging device, the method comprising:
attaching an imaging module with an imaging element that is configured to image incident light introduced from an upper surface of a housing, wherein the housing holds a lens barrel and the imaging element; and
arranging a holding unit that is configured to surround and hold a side surface of the imaging module, wherein
the side surface is adjacent to the upper surface of the housing,
the holding unit includes a first leg piece at an upper end of the holding unit and a second leg piece at a lower end of the holding unit, and the first leg piece and the second leg piece are in contact with the housing to fix the holding unit in the housing.

5. The method of manufacturing the imaging device according to claim 4, the method further comprising:
    connecting a plurality of imaging modules, wherein the plurality of imaging modules includes the imaging module; and
    attaching the plurality of imaging modules to the holding unit that is configured to surround and hold side surfaces of the plurality of imaging modules.

6. The method of manufacturing the imaging device according to claim 5, the method further comprising:
    adjusting optical axes of the plurality of imaging modules; and
    connecting the plurality of imaging modules with the adjusted optical axes.

7. The imaging device according to claim 1, wherein the imaging module is sandwiched between a first cushion at an upper portion of the imaging module and a second cushion at a lower portion of the imaging module.

\* \* \* \* \*